United States Patent [19]

Tanaka

[11] 4,438,058

[45] Mar. 20, 1984

[54] EXPANDING PROCESS

[76] Inventor: Yoshio Tanaka, No. 7-6, Shibuya 2-Chome, Shibuya-ku, Tokyo, Japan

[21] Appl. No.: 356,240

[22] Filed: Mar. 8, 1982

[30] Foreign Application Priority Data

Mar. 9, 1981 [JP] Japan ................................. 56-33550

[51] Int. Cl.$^3$ .............................................. B29D 27/00
[52] U.S. Cl. ............................... 264/51; 264/DIG. 9; 521/57
[58] Field of Search ..................... 264/DIG. 9, 53, 51; 521/57

[56] References Cited

U.S. PATENT DOCUMENTS

| | | | |
|---|---|---|---|
| 3,086,885 | 4/1963 | Jahn | 264/DIG. 9 |
| 3,697,454 | 10/1972 | Trimble | 264/DIG. 9 |
| 3,819,544 | 6/1974 | Pillar et al. | 264/DIG. 9 |
| 4,003,858 | 1/1977 | Biglione et al. | 264/DIG. 9 |
| 4,020,133 | 4/1977 | Altares, Jr. | 264/DIG. 9 |

FOREIGN PATENT DOCUMENTS

| | | |
|---|---|---|
| 49-3966 | 1/1974 | Japan ............................ 264/DIG. 9 |
| 1289466 | 9/1972 | United Kingdom . |
| 1406022 | 2/1975 | United Kingdom . |
| 1547305 | 6/1979 | United Kingdom . |
| 1562580 | 3/1980 | United Kingdom . |

OTHER PUBLICATIONS

*Emulsions: Theory and Practice*, New York, Reinhold, ©1957, pp. 188–197.

*Kirk–Othmer Encyclopedia of Chemical Technology*, Third Edition, vol. 22, Sulfonation and Sulfation to Thorium and Thorium Compounds, New York, John Wiley & Sons, pp. 360–361.

"The Condensed Chemical Dictionary," Eighth Edition, Revised by Gessner G. Hawley, New York, van Nostrand Reinhold, ©1971, pp. 380, 447, 710, 711, 825.

*Primary Examiner*—Philip E. Anderson
*Attorney, Agent, or Firm*—Stevens, Davis, Miller & Mosher

[57] ABSTRACT

The invention relates to a process of expanding styrene beads which comprises expanding said beads in the presence of a surfactant having a HLB value of 3 to 18 and showing a surface resistance less than $10^{14}\Omega/cm$. By the process, blocking of beads is prevented, antistatic effect can be given to the shaped article and saving of steam used in the course of expanding is achieved.

11 Claims, No Drawings

EXPANDING PROCESS

The present invention relates to a process of an expanding an expandable resin. More paticularly, the invention relates to a process for blowing an expandable resin such as polystyrene beads in the presence of a surfactant.

At the present time, expanded resin articles are widely used in several fields, especially in the field of packaging. They are commonly used as packing materials, packaging sheets, and crating cases which are shaped so as to conform to each packed material.

As the foamed resin, foamed PVC, foamed polyethylene and foamed polystyrene and the like are used for this purpose. Among these resins, easily foamable polystyrene is preferably used as the molded article. As packaging sheet, flexible foamed polyethylene is preferably used. Several kinds of foamed resins are used as packaging material.

However, these foamed resins are easily electrostatically charged. Especially, when the atmosphere is in dry condition, static electricity of over 10,000 volts is often accumulated on the surface of the foamed resin article. Such high electricity accumulated on a foamed resin article for use in an electric apparatus causes a series obstacle such as breakdown of the electrical apparatus.

On the other hand, the foaming of these resins is carried out by heating, ordinarily with steam, resin pellets or beads in which a foaming agent such as an organic foaming agent or petroleum chemical having low boiling point is contained. Therefore, under recent cercumstances, the price of foamed articles has increased owing to the rise of the price of steam. Therefore, a decrease of the price of foamed article is sought.

Hereinafter, the foaming process is explained by taking foamed styrene as an example. At first, styrene beads are pre-expanded by blowing super-heated steam into them. After cooling, the preexpanded styrene beads are charged into a mold and then they are heated by steam and are expand into a shaped article. In this process, the styrene beads are apt to cause blocking between beads to form blocks of preexpanded styrene beads. To avoid the blocking of beads, calcium stearate and the like is added or coated on the beads in an amount of 1 to 2% by weight based on the weight of beads. By this method, blocking of beads is surely prevented but the amount of steam used is not changed, and antistatic effect is also not obtained.

On the other hand, in order to provide an antistatic effect on a shaped article, a commercially available antistatic agent ordinarily is applied on the surface of shaped articles. However, the antistatic effect obtained by this method is limited only to the coated surface thereof and does not reach into the inner part of them. As another approach, an attempt to mix electrically-conductive carbon with beads has been made in order to give an antistatical effect to the shaped article. However such an approach is used only for some special uses for the reason that carbon black is high in price and the obtained shaped article becomes black in color.

Under such circumstances, it has now been found as the results of an intensive study that both effects of antistatic effect on shaped article and decrease of the steam used in course of expanding styrene beads can be attained in one process by means of the application to the beads of a surfactant having both properties of particular surface activity and surface resistant performance. The object of the invention is to provide a method for blowing expandable resin particles which can attain at the same time both an antistatic effect on the shaped resin artice and decrease of the amount of steam used in the course of expanding.

In the methods for application of antistatic agent to resin, there are two methods. One is an inner application method in which an antistatic a agent is incorporated into the resin and the other an outer use in which an antistatic agent is coated on the surface of a shaped artice.

It has now been found that in order to attain the two object at the same time the surfactant should be present in the course of expanding the resin particles. By this method, blocking of preexpanded beads is also prevented at the same time.

That is to say, by co-existence of a surfactant with expandable beads in the course of pre-expanding, the wettability of the beads is improved to make an improvement on the surface contact of beads with blown steam and condensed hot water. Therefore, the heat transfer between beads and steam is smoothly conducted. At the same time this brings about the saving of steam used in the course of expanding in an amount of 10% by weight.

As mentioned above, calcium stearate is one kind of lubricant, and it has been successfully used to obtain the effect of prevention of blocking of beads, but it can not attain the decrease of the used amount of steam and also cannot produce the antistatic effect.

On the other hand, according to the invention, the presence of a surfactant in the course of pre-expanding brings improvement on the wettability of beads and thus blocking is prevented by accelarating adhesion between beads.

Because, in this way, the preexpanded beads retain surfactant on their surface after shaping, the formed article according to the invention having surfactant on the surface and inner part thereof can attain at the same time the anti-static effect in addition to blocking preventing effect.

As seen from the case of carbon black, anitistatic effect can in general be obtained by providing an small amount of conductivity on the surface of an article. In the most preferable case, a surfactant having a surface resistance less than $10^{14}$ $\Omega$/cm, preferably $10^3$–$10^{12}$ $\Omega$/cm at 20° under relative humidity of 50% as measured on the surface of the molded article is used in the invention.

Also, a surfactant having HLB of 3–18, preferably 5 to 15 is preferably used in the invention.

As an embodiment of the invention, the styrene beads are coated with a surfactant satisfying both conditions at the same time and then the coated beads are pre-expanded.

As surfactants satisfying these conditions there may be mentioned anionic surfactants, cationic surfactants, non-ionic surfactants or amphoteric surfactants. As examples thereof, the following are illustrated. However other surfactants can be used in the invention, if they satisfy these conditions.

Stearyl-methyl-ammoniumchloride
Stearyl-phosphate
Poly-oxyethylene-laurylether ($\bar{n}=10$)

In the above, a surfactant having a HLB under 3 can not be used in the invention because of its low antistatic effect and low surface activity.

In the case of a surfactant having a HLB over 18, only an unsatisfactory antistatic effect is attained.

The above listed surfactants also have a surface resistance lower than $10^{14}$.

As seen from the above, HLB and surface resistance properties are partly corelated with each other. However, it is necessary for the invention to satisfy the two conditions at the same time.

As a method for applying a surfactant to styrene beads, surfactant is preferably dispersed on the surface of beads by coating or spraying the surfactant itself or a solution of the surfactant thereon.

As mentioned above, surfactants are applied to the beads in an amount 0.5-to 10% by weight of beads. However, if an amount less than 0.5% by weight is used, unsatisfactory results are obtained. If an amount over 10% by weight, the bonding between beads becomes weak, thus giving rise to a decrease in strength of the molded article. The use of the surfactant in this range can attain the desired antistatic effect on the shaped article, and a saving of the used amount of steam used, and, furthermore, the decrease of the strength of the molded article is not caused.

In the above, only polystyrene beads are illustrated as the foaming resin, but other resins can, of course, be used in the invention.

EXAMPLE 1

Polystyrene beads (Kanepal GT, produced by Kanegafuchi Chemical Industry Co. Ltd.) are mixed and coated with 2% by weight based on the weight of beads of stearyl-methyl-ammonium-chloride which is a cationic surfactant. The beads coated with the surfactant were pre-expanded 50 fold in volume with steam. The pre-expanded beads were placed in a mold and shaped with steam heating.

The molded article has the intended strength, shows a surface resistance of $5 \times 10^{12}$ $\Omega$/cm and has a high antistatic performance.

As compared with non-coated beads, the styrene beads of the invention cause no blocking and the molded article is perferably fuse-bonded and the finish of the molded article shows a good luster.

Furthermore, when the molded article of the invention is cut with a saw, saw dust does not adhere to the saw blade and this shows that antistatic effect prevails in the inner part of the molded article.

When a surfactant is not added to the beads, about 18 kg of steam per 1 kg of beads is needed for the expansion of styrene beads, but the beads of the invention used about 16 kg of steam per 1 kg of beads. This shows about a 10% decrease of steam according to the invention.

EXAMPLE 2

Example 1 was repeated except that Eslene beads styrene beads, (made by Sekisui Chemical Industry Co. Ltd.) were used and, as the surfactant, stearyl-phosphate sodium salt was used. A molded article having a good surface appearance which shows a surface resistance of $2 \times 10^9$ $\Omega$/cm was obtained.

EXAMPLE 3

Eslene HE, styrene beads (for food), were coated with 2% by weight of poly-oxyethylene-sorbitanemonostearyl-ester. The coated beads were preexpanded 20 fold in volume and then shaped in a mold.

The molded article showed a surface resistance of $7 \times 10^{11}$ $\Omega$/cm.

What is claimed is:

1. Process for blowing expandable resin particles, which comprises expanding said resin particles in the presence of surfactant in an amount of 0.5 to 10% by weight based on the particles.

2. Process for blowing expandable resin particles according to claim 1 wherein said expandable resin particles are polystyrene beads.

3. Process for blowing expandable particles according to claim 1 or 2, wherein said styrene beads are coated with said surfactant.

4. Process for blowing expandable resin particles according to claim 3, wherein coating is carried out by spraying said surfactant on said beads in the form of surfactant itself or organic solution thereof.

5. Process for blowing expandable resin particles according to any one of claims 1, 2 or 4, wherein said surfactant has a HLB of 3 to 18, and shows a surface resistance less than $10^{14}$ $\Omega$/cm.

6. Process for foaming expandable resin particles according to claim 5, wherein the surfactant is at least one selected from the group conssiting of stearyl-trimethyl-ammoniumchloride, stearyl-phosphate and poly-oxy-ethylene-lauryl-ether.

7. Process for blowing expandable resin particles according to claim 3, wherein said surfactant has a HLB of 3 to 18, and shows a surface resistance less than $10^{14}$ $\Omega$/cm.

8. A process according to claim 5 wherein the HLB is 5 to 15.

9. A process according to claim 5 wherein the surface resistance is $10^3$ to $10^{12}$ $\Omega$/cm.

10. A process according to claim 7, wherein the HLB is 5 to 15.

11. A process according to claim 7, wherein the surface resistance is $10^3$ to $10^{12}$ $\Omega$/cm.

* * * * *